United States Patent [19]

Negishi et al.

[11] Patent Number: 4,727,382

[45] Date of Patent: Feb. 23, 1988

[54] INTENSITY CONTROL FOR A SEMICONDUCTOR LASER OF A LASER BEAM PRINTER

[75] Inventors: Kiyoshi Negishi, Saitama; Shinyu Ikeda, Tokyo; Manabu Imoto, Tokyo; Hideo Aida, Tokyo, all of Japan

[73] Assignee: Asahi Kogaku Kogyo Kabushiki Kaisha, Tokyo, Japan

[21] Appl. No.: 924,879

[22] Filed: Oct. 30, 1986

[30] Foreign Application Priority Data

Nov. 15, 1985 [JP] Japan ............................ 60-256133
Jan. 16, 1986 [JP] Japan ............................ 61-4676[U]

[51] Int. Cl.⁴ .......................... G01D 9/42; H04N 1/21
[52] U.S. Cl. ............................ 346/108; 358/298; 358/300
[58] Field of Search .............. 346/108, 76 L, 160; 358/298, 300

[56] References Cited

U.S. PATENT DOCUMENTS 4,513,300 4/1985 Tatsumo et al. ............... 346/160
4,630,223 12/1986 Schoon ....................... 346/108 X
4,635,131 1/1987 Terada et al. ................ 358/298

FOREIGN PATENT DOCUMENTS 120662 6/1985 Japan ........................ 346/108

OTHER PUBLICATIONS

Article: "HP's New Laserjet Printer" by Josef Bernard, -Computers and Electronics Magazine Jul. 1984-4 pages.

*Primary Examiner*—Clifford C. Shaw
*Assistant Examiner*—Patrick W. Foster
*Attorney, Agent, or Firm*—Sandler & Greenblum

[57] ABSTRACT

The present invention provides an intensity control device for a laser in a laser beam printer that produces a hard copy of image information by copy-processing a photosensitive surface scanned by the laser while it is in a scanning mode during which the laser is modulated by the image information. The intensity control device according to the present invention stores a first representation of a present light intensity of the laser during its non-scanning mode. It further stores a second representations of a user selected image density for a hard copy produced by the printer. The first and second representations are combined for forming a control voltage during a non-scanning mode of the laser. Finally, a current is produced that is supplied to the laser in response to the control voltage such that the intensity of light produced by the laser is dependent on both the first and second representations.

19 Claims, 12 Drawing Figures

INTENSITY CONTROL FOR A SEMICONDUCTOR LASER OF A LASER BEAM PRINTER

DESCRIPTION

1. TECHNICAL FIELD

This invention relates to an intensity control for a semiconductor laser of a laser beam printer.

2. Background Art

In a laser beam printer (LBP), an electrostatic latent image is formed on a photosensitive surface by scanning the surface with a laser beam modulated on the basis of image information such as numbers, letters, or the like. A hard copy of the image information is obtained from the photosensitive surface by a copy-processing technique that includes development of a sensible image, and its transcription and fixation on a hard copy. Small-sized LBP's, which use semiconductor lasers, are increasingly utilized, and are available at a relatively low price.

In conventional LBP's that employ semiconductor lasers such as laser diodes, the printing concentration (i.e., the image density of the hardcopy), is established using an automatic power control (APC) circuit which effects feedback-control of the current supplied to the laser based on detection of the intensity of light it emits. In the operation of a conventional APC, a value representative of the detected intensity of light emission is compared with a reference value (reference voltage); and the current supplied to the laser is adjusted accordingly.

In an LBP equipped with an APC circuit of the type described, however, the image density of the hard copy is varied either by manipulating a setting dial (volume) with a view toward changing the reference voltage of the APC circuit, or by manipulating an adjustment dial that controls the development bias in the copy-processing operation subsequent to scanning. These conventional adjustments are, however, attended by a number of problems.

First, arbitrary user changes of the reference voltage is undesirable in terms of design and operation of an APC circuit. In addition, if image density of the hard copy is to be varied page-by-page by adjusting the development bias, the image density for each page must be set prior to printing the page, thus increasing print cycle time. As printing speed is changed, concomitant changes in the intensity of light emitted from the semiconductor laser are required. This also creates a problem similar to that produced when the image density is varied by adjusting the development bias.

Furthermore, because of variations in differential efficiency $\eta$ (where $\eta = mW/mA$) from one semiconductor laser to another, it is difficult to set a single light emission intensity value that will be satisfactory for controlling the light emission intensity of various LBP's. Hence, a need exits for a system that relates light emission intensity to actual intensity of light emission for any LBP.

It is therefore an object of the present invention to provide a new and improved intensity control for a laser beam printer which overcomes, or substantially ameloriates, the deficiences of the prior art as described above.

SUMMARY OF INVENTION

An intensity control device, according to the present invention, is used with a laser of a laser beam printer that produces a hard copy of image information by copy-processing a photosensitive surface scanned by the laser while it is in a scanning mode during which the laser is modulated by said image information. Said intensity control device includes means operative during a non-scanning mode of said laser for storing a first representation of a preset light intensity of said laser, and means for storing a second representation of a user selected image density for a hard copy produced by the printer. Also included are means operative during a non-scanning mode of said laser for combining said first and second representations and thus forming a control voltage. Finally, the invention provides control means responsive to said control voltage for producing a current that is supplied to said laser which thereby emits light whose intensity is dependent on both the first and second representations.

The first representation establishes the intensity of light emitted by the laser, before it begins scanning, at a preselected level determined by the manufacturer. The second representation determines the increment of light intensity that must be added to the preset intensity in order for the resultant hardcopy to have the desired image density. The current produced by the control voltage formed in response to the combination of the two representations is thus functionally related to the intensity of light that will produce the desired results during a printing operation.

In one embodiment of the invention, the intensity control device includes photosensitive means responsive to the intensity of light emitted by said laser for producing a voltage $V_x$ representative of the last mentioned intensity, and means for producing a voltage $V_{ref}$ representative of the preset light intensity. A comparator compares the voltage $V_x$ with the voltage $V_{ref}$, and produces an output voltage having a first level when $V_{ref} > V_x$, and having a second level when $V_{ref} < V_x$. The invention includes a first digital register, and means for sequentially evaluating the level of said output voltage over a predetermined period of time and incrementing the first register when the output voltage has said first level, and decrementing the first register when said output voltage has said second level whereby, at the end of said predetermined period of time, the contents of said first register converges to a representation of a preset intensity of said laser at which $V_{ref}$ is approximately equal to $V_x$.

The invention also includes a second digital register, and means for setting the contents of the second register with a user selected image density value. Means are also provided for combining the first and second representations includes means for adding the contents of said first and second registers to define a sum, and storing said sum in a sum register. A D/A converter is responsive to the contents of the sum register for producing the control voltage that controls the current supplied to the laser.

According to the present invention, the contents of the second register are set only during the time the laser is in a non-scanning mode. Moreover, the intensity control device of the present invention includes a solid state device having an output electrode for connection to the laser, and a control electrode to which the control voltage is applied for controlling the level of current in the output electrode in accordance with the level of current flowing in said control electrode, and a selectively operable switch shunting said laser. The switch is held in open position during a non-scanning mode of said laser allowing the level of current flowing in the laser to be adjusted.

During a scanning mode operation of the laser, the switch is operated in response to image information whereby the intensity level of the laser during scanning is based on the preset intensity of the laser and the desired image density of the resultant hardcopy as well as image information.

BRIEF DESCRIPTION OF THE DRAWINGS

Embodiments of the present invention are shown in the accompanying drawings wherein.

DETAILED DESCRIPTION

Figure 2:
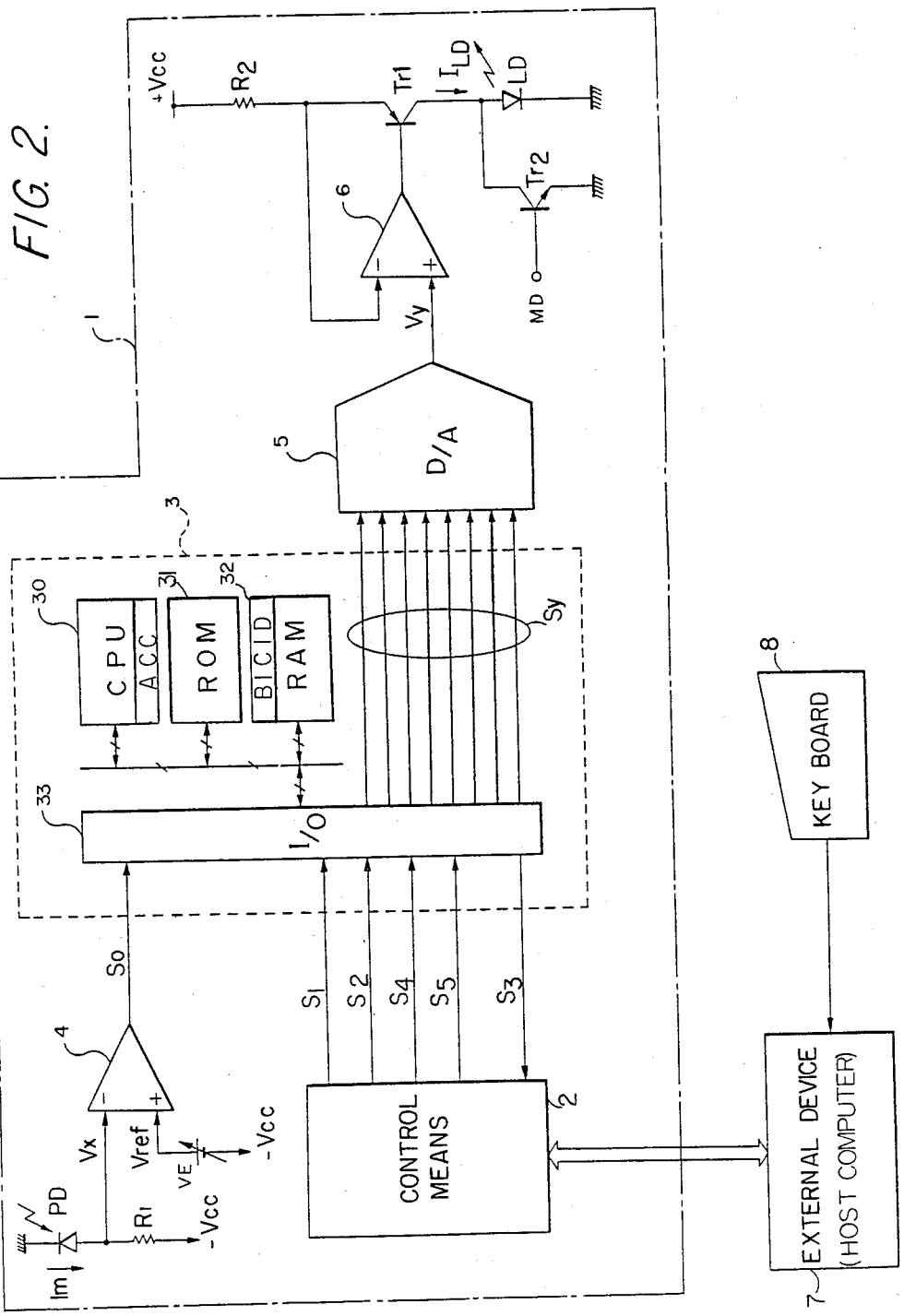
FIG. 2 is a block diagram showing one embodiment according to the present invention.

Referring now to the drawings, one embodiment of the present invention is disclosed in FIGS. 2-6. In FIG. 2, reference numeral 1 designates a control unit of a laser beam printer (LBP) and comprises control means 2, intensity modulation control means 3, comparator 4, digital-to-analog (D/A) converter 5, buffer (voltage follower) 6, PIN-photodiode PD, resistance $R_1$, variable power source VE for setting an initial value (reference value), resistance $R_2$, PNP-type transistor $Tr_1$ for establishing the intensity of a semiconductor laser (laser diode) LD, and NPN-type transistor $Tr_2$ for controlling modulation of the intensity of the laser during its scanning mode of operation. Control means 2 is systemically constituted by a microcomputer or the like and has control over the LBP as a whole.

Figure 1:
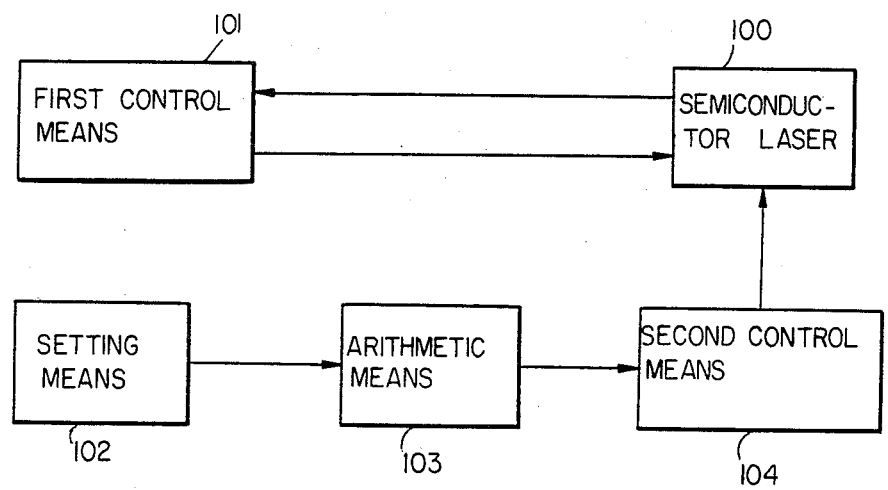
FIG. 1 is a block diagram showing a schematic representation of the present invention.

Intensity modulation control means 3 is constituted by a microcomputer including central processing unit (CPU) 30, program memory (ROM) 31, data memory (RAM) 32, and input-output (I/O) device 33. Intensity modulation control means 3 performs the functions shown schematically by the apparatus in FIG. 1 when CPU 30 executes programs previously stored in ROM 31 as described below. Such apparatus includes first control means 101, setting means 102 arithmetic means 103, and second control means 104.

The operation of control means 2, host computer 7, and keyboard 8 is described in detail below, and are all defined as constituent elements of setting means 102 in terms of its function. Moreover, the functions of first and second control means 101, 104 include constituent elements such as the input side of comparator 4 and the output of converter 5.

Control means 2 supplies control signals $S_1$-$S_5$ to I/O device 33 of intensity modulation control means 3. Such control signals include enable signal $S_1$, modulation intensity value reading start signal $S_2$, synchronizing signal $S_3$, modulation intensity value data $S_4$, and comparison sampling signal $S_5$ which are described below.

Initial voltage value $V_{ref}$ applied to non-inversion input terminal (+) of comparator 4, may be predetermined, for instance, by voltage $V_E$ set by the manufacturer before the unit is shipped from the factory. Comparator 4 compares initial value $V_{ref}$ with a detected light emission intensity value $V_x$ which is produced by the flow of current $I_m$ through photodiode PD, and through resistance $R_1$. Because the impedance of photodiode PD is functionally related to the intensity of light emitted by semiconductor laser LD, voltage $V_x$ is representative of the light output of the laser. As described below, when $V_x < V_{ref}$, comparison signal $S_0$, produced by comparator 4 and applied to I/O device 33, has the value "H"; and when $V_x > V_{ref}$, comparison $S_0$ has the value "L". Thus, when the light output of laser LD is below a predetermined threshold, $V_x > V_{ref}$ and signal $S_0$ has the value "L"; and when the light output exceeds the threshold, $V_x < V_{ref}$ and signal $S_0$ has the value "H". As described in detail below, the output of comparator 4 allows the light output of laser LD to increase gradually from a low value to a desired value in a number of small steps instead of a single large step.

D/A converter 5 effects digital/analog conversion of driving electric control value $S_y$ produced by input-output device 33 of intensity modulation control means 3. Control value $S_y$ is explained below.

Resistance $R_2$, the emitter and collector junctions of transistor $Tr_1$, and semiconductor laser LD are serially connected between +Vcc and ground. Driving electric current control voltage $V_y$, produced by D/A converter 5, is applied, via buffer 6, to the base of transistor $Tr_1$.

Transistor $Tr_2$ shunts laser LD in that the emitter and collector of this transistor are connected in parallel with the laser. Modulation signal MD, outputted from control means 2, is applied to the base of transistor $Tr_2$. When transistor $Tr_2$ is biased to an OFF state by signal MD, semiconductor laser LD is supplied with driving current $I_{LD}$ that is functionally related to driving electric control voltage $V_y$ thereby causing laser LD to emit light of an intensity functionally related to the value of voltage $V_y$. When transistor $Tr_2$ is biased to an ON state, the collector of transistor $Tr_1$ is grounded and no current flows through laser LD which consequently emits no light. When transistor $Tr_2$ is active under the influence of signal MD, the current through laser LD is composed of current $I_{LD}$, which depends on voltage $V_y$, and of current which depends on modulation signal MD.

Host computer 7 transfers various kinds of data such as modulation intensity value data, and print image intensity or image density data to the control means of LBP. Keyboard 8 may be used to effect manual input of modulation intensity values, and is manipulated by the user when setting image densities for any or all pages of hard copy obtained from the LBP.

Initial voltage $V_{ref}$ applied to comparator 4 of the LBP is preset to a given value by the manufacturer using variable power supply $V_E$. The user of the LBP may input, via keyboard 8, a desired set of modulation intensity values (data, for example, of 6-bit data length) for establishing the printing concentration or image density of particular pages of the hard copy of a document to be printed utilizing the LBP.

A variety of modulation intensity values might have to be inputted. For example, image density could be uniform throughout all the pages, and in such case, only a single modulation intensity value need be inputted. Alternatively, a different image density may be required for each page, and in such case, a modulation intensity value for each page would have to be inputted. In any case, the user of the LBP sets the modulation intensity in accordance with relevant requirements of the hard copy to be produced. The modulation intensity values so set by keyboard input by the user is transferred to predetermined data storage areas of host computer 7 and in control means 2 for storage therein.

A standard modulation intensity value, or default value, is stored in the data storage areas of host computer 7 and of control means 2. On occasions when the user of the LBP does not chose to input values using the keyboard, the standard or default value is employed.

Upon actuation of the LBP, CPU 30 of the intensity modulation control means 3 performs an initialization procedure. Subsequently, CPU 30 continues processing in the manner specified in FIG. 3. First, CPU writes [0] to register C in RAM 32. The contents of this register are read into I/O device 33 which produces the value [0] for driving electric current control value $S_y$. With a value of [0] applied to D/A converter 5, voltage $V_y$ is zero and buffer 6 causes collector current $I_{LD}$ of transistor $Tr_1$ to have a relatively small value. At the same time, modulation signal MD from control 2 is such that transistor $Tr_2$ is biased to its ON state short-circuiting semiconductor laser LD which does not emit light.

Figure 4:
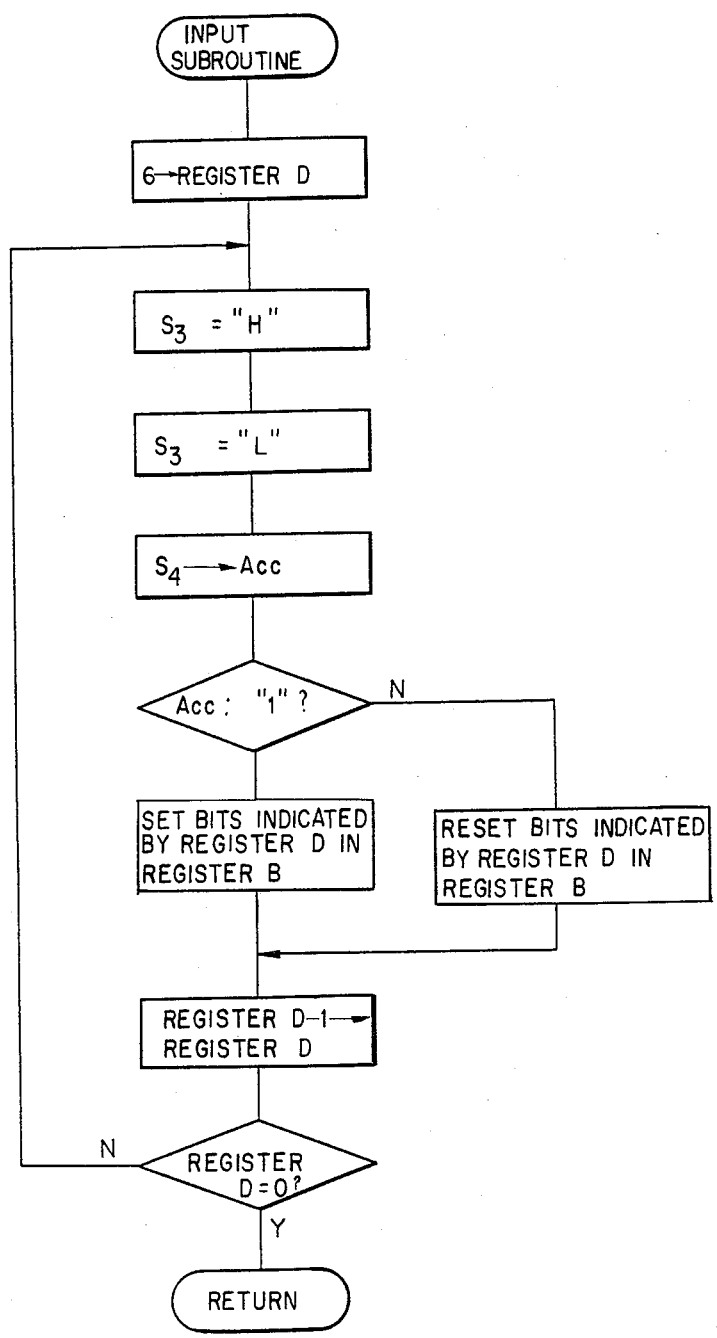
FIG. 4 is a flow chart of programs of an input subroutine of FIG. 3.

Second, CPU 30 checks whether or not enable signal $S_1$ has high level "H". As long as enable signal $S_1$ remains at low level "L", the CPU waits. Assuming signal $S_1$ rises to high level "H" at time $t_1$ shown in FIG. 6(a), CPU 30 moves to the next step in which it checks whether or not modulation intensity value reading start signal $S_2$ has high level "H". As long as signal $S_2$ remains at low level "L", the CPU waits. Assuming signal $S_2$ rises to high level "H" at time $t_2$ shown in FIG. 6(b), CPU 30 moves to the next step wherein an input routine shown in FIG. 4 is executed. When the input subroutine is called, data of length [n] (n=6 in this embodiment) is written to synchronization signal generating register D in RAM 32.

After a predetermined delay, control means 2 produces synchronization signal $S_3$ in the form of a pulse train made up of sequential changes between the low and high levels. The first data bit (i.e., the first bit of the 6-bit data word) is read from control means 2 to accumulator ACC in CPU 30 by synchronization with the termination of a pulse in synchronization signal $S_3$. Each succeeding data bit is read into register D such that the image intensity for the first page of the hard copy for a document to be printed is transferred to register D.

In subsequent steps, shown in FIG. 4, accumulator ACC sequentially checks whether or not each bit is "1". If it is "1", the corresponding bit in register B, which is the modulation intensity value storage register, is set to "1". If the bit is "0", the corresponding bit in register B is likewise reset to "0". Thereafter, the value of register D is decremented by 1. Then, the accumulator ACC checks whether or not the value of register D has become "0". If it is not yet "0", the program returns to the processing step where the port for outputting synchronization signal $S_3$ in the input-output device 33 is made to rise from low level "L" to high level "H", and the respective processes before this processing step are repeated.

The repeated operation continues until the value of the contents of register D reaches "0" thereby completing a transfer from control means 2 to register D of a particular modulation intensity value $S_4$ (in this case, a 6-bit data word), which determines the image density for the first page of the hard copy to be printed. The processing of the input subroutine is thus completed, and CPU 30 returns to the main routine of FIG. 3.

Figure 3:
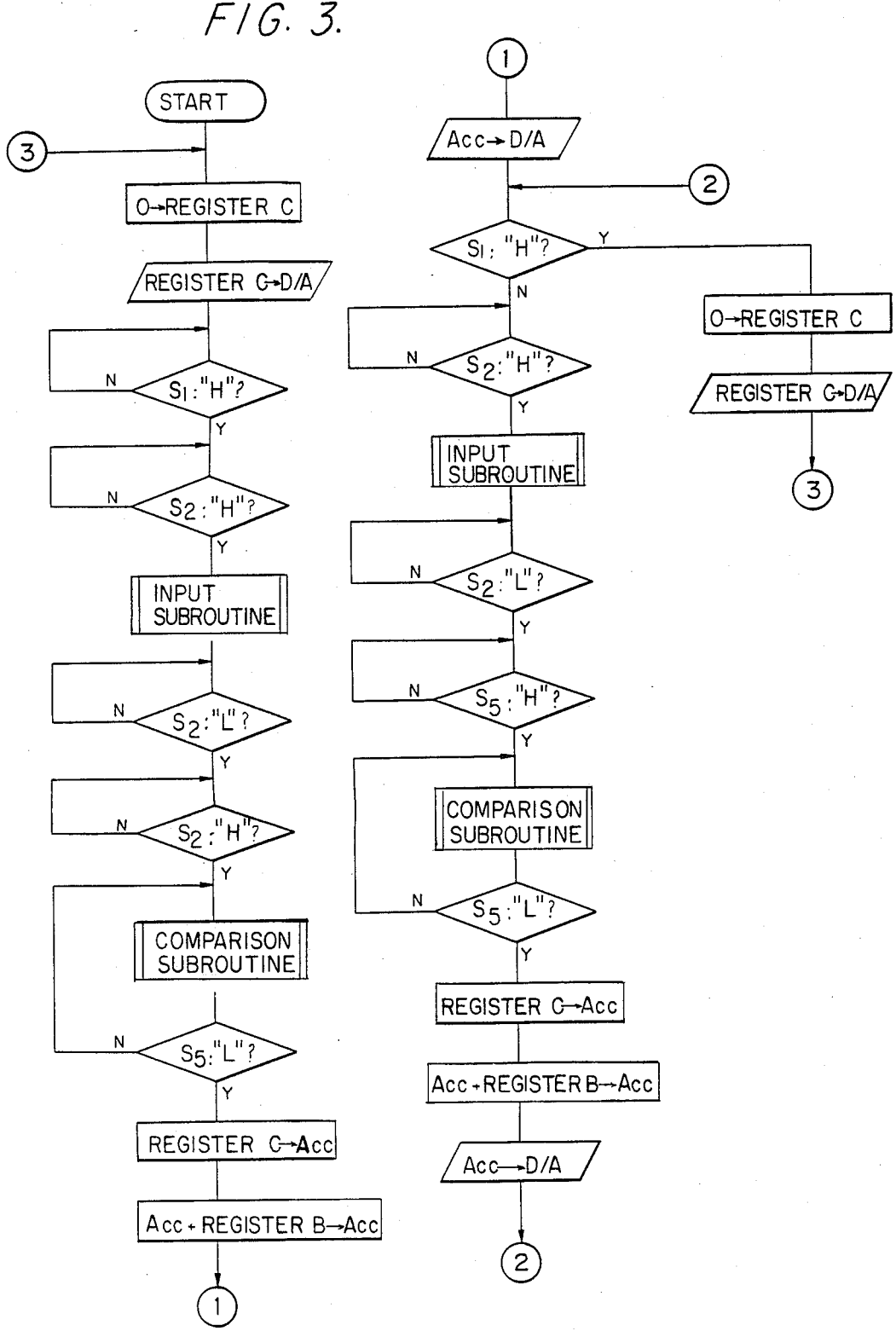
FIG. 3 is a flow chart of programs to be executed by central processor unit (CPU) 30 of FIG. 2.

Situations in which the aforementioned input subroutine is processed are illustrated in FIGS. 6(c) and 6(d) which show how the first page modulation intensity value data [011000] is written to register B. Referring now to FIG. 3, after finishing the execution of the input subroutine, CPU 30 checks whether or not modulation intensity value reading start signal $S_2$ has returned to low value "L". Only when this signal returns to low level "L" at time $t_3$ shown in FIG. 6(b) does the program move to the next step in which CPU 30 checks as to whether or not comparison sampling signal $S_5$ sent from control means 2 has changed to high level "H". When signal $S_5$ rises to high level "H" at time $t_4$ shown in FIG. 6(e), the program moves to the next step in which a comparison subroutine (FIG. 5) is executed for the purpose of bringing the light intensity of laser diode LD up to its design level.

At time $t_4$, control means 2 causes modulation signal MD applied to the base of transistor $Tr_2$ to drop to low level "L" driving transistor $Tr_2$ to its OFF state whereby collector current $I_{LD}$ flowing in transistor $Tr_1$, by reason of the small voltage $V_y$ applied to buffer 6, now begins to flow through semiconductor laser LD which responds by emitting light at a low level causing a decrease in the impedance of diode PD.

Figure 5:
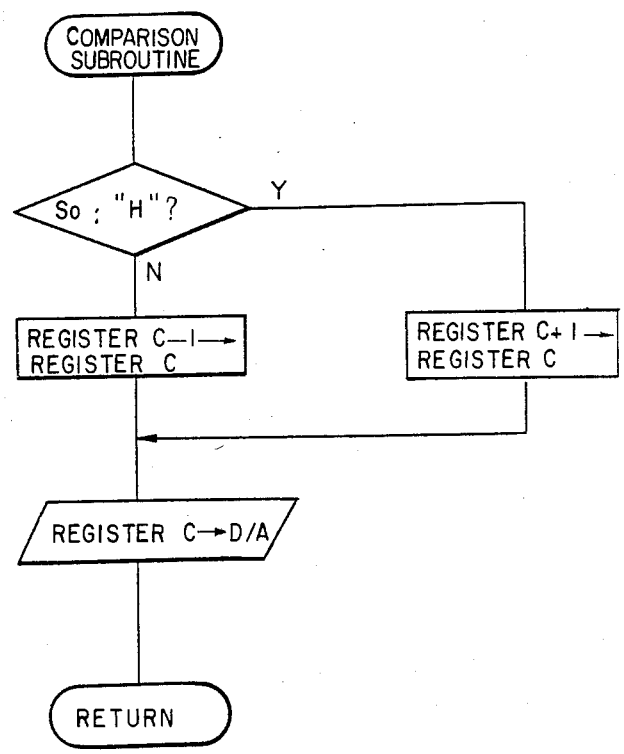
FIG. 5 is a flow chart of programs of a comparison routine of FIG. 3.
Figure 6:
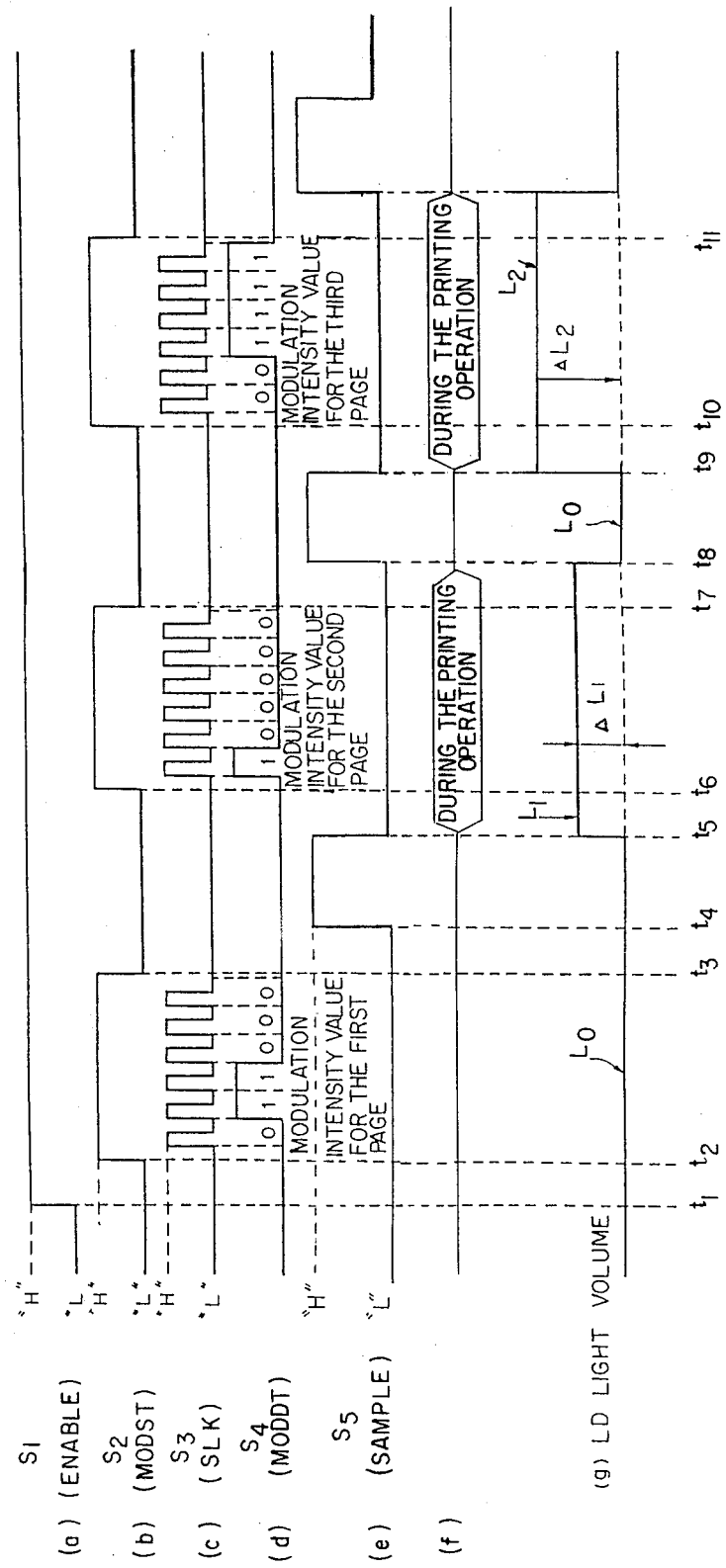
FIG. 6 is a timing chart relative to the operation of the embodiment of FIG. 2.
Figure 7:
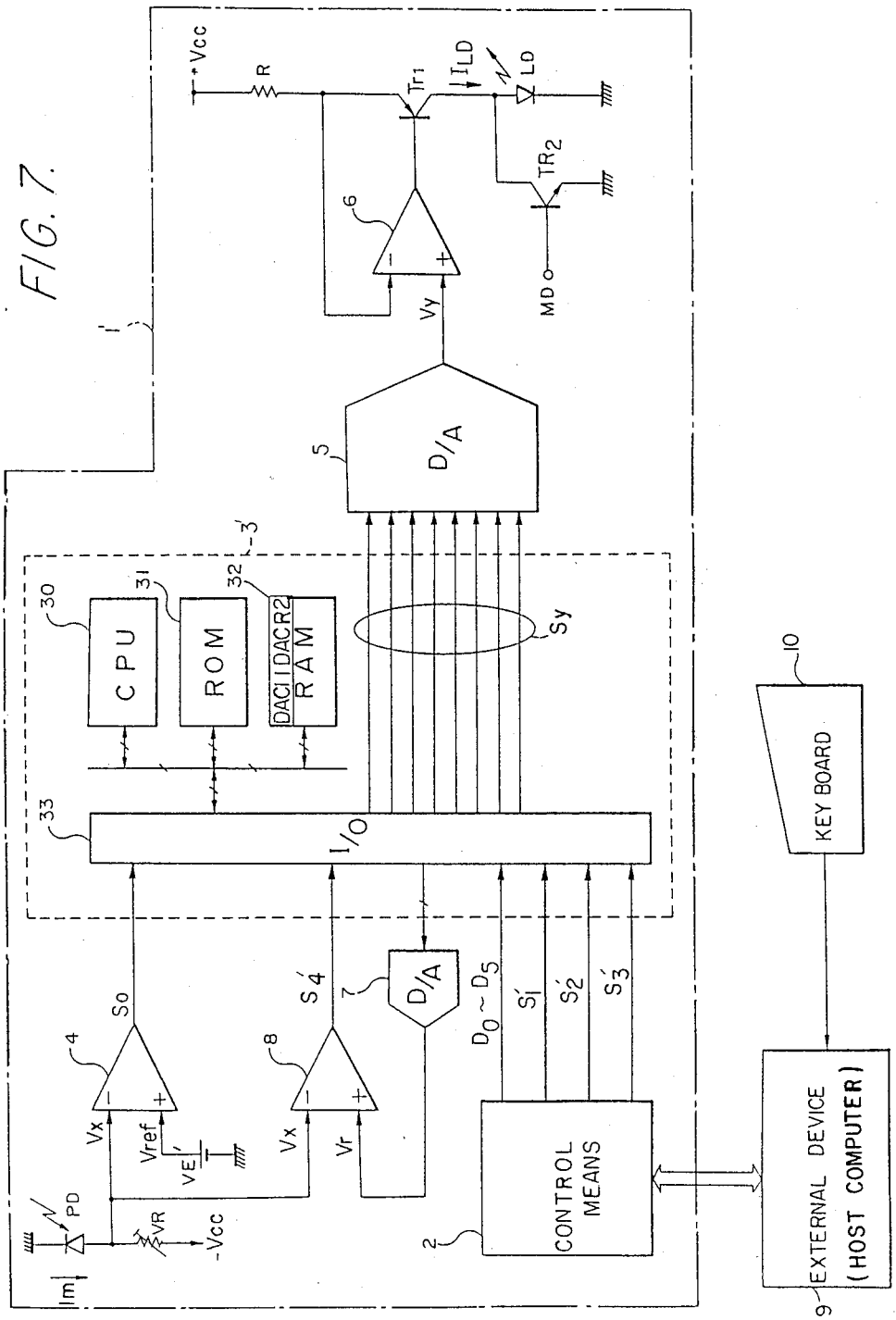
FIG. 7 is a block diagram showing another embodiment according to the present invention.

The intensity of light emitted by the laser diode is relatively low as execution begins of the comparison subroutine shown in FIG. 5. When the comparison subroutine is called, the first step is to test whether or not the level of comparison signal $S_0$ produced by comparator 4 is high level "H". Because semiconductor laser LD begins to emit light under feeble driving electric current $I_{LD}$ existing at the start of the comparison, the resultant decrease in impedance of diode PD permits a small current $I_M$ to flow through the PIN-photodiode PD. For this reason, light emission intensity value $V_x$ (voltage value), which is proportional to current $I_M$, is relatively small. The circuit is designed so that in this initial state, the inequality $V_{ref} > V_x$ exists, and hence the level of comparison signal $S_0$ is high level "H".

Consequently, as a result of the level-test of signal $S_0$, CPU 30 increments register C in RAM 32 which contains [0] at the initial time. Recalling that the contents of register C establishes current control value $S_y$ applied to D/A converter 5, the voltage output from this converter, namely voltage $V_y$ is increased by one step. In response, the conduction level of transistor $Tr_1$ increases by one step, and collector current $I_{LD}$ also increases causing the intensity of light emitted by laser LD to increase by one step. In turn, the impedance of photodiode PD decreases by one step.

After register C is incremented, CPU 30 returns to the main routine (FIG. 3) whereby the level of sampling signal S$_5$ is tested. If the level of this signal is high level "H", the foregoing comparison subroutine is call-executed again. Again, the level of the comparison signal S$_O$ is tested. If its level is high level "H", which means that the inequality V$_{ref}$>V$_x$ still exists, register C is again incremented causing another step-increase of voltage V$_y$ thus further increasing the intensity of light emitted from semiconductor laser LD. In response, the impedance of photodiode PD further decreases thus raising the voltage V$_x$. After register C is incremented, CPU 30 again returns to the main menu and tests whether or not signal S$_5$ has reached low level "L". If not, the comparison subroutine is again call-executed.

The process described above continues as both the light intensity produced by laser diode LD and the voltage V$_x$ increase in stair-case fashion. If, during this process, V$_x$ reaches a level that exceeds V$_{ref}$ so that the level of value S$_O$ switches from "H" to "L", which is indicative of V$_{ref}$<V$_x$ (i.e., the light intensity of laser diode LD has a value greater than the design value), the comparison subroutine causes register C to be decremented thus decreasing the value S$_y$ and causing the light emission of the laser diode to decrease.

By insuring that interval t$_5$-t$_4$ is of sufficient duration, light emission intensity voltage V$_x$ converges to the point where V$_x$ is essentially equal to V$_{ref}$. The value of the register C is thus brought into correspondence to the initial value V$_{ref}$, and the driving electric current I$_{LD}$ becomes an initial driving electric current value corresponding to the initial value V$_{ref}$.

Thus, during the interval t$_5$-t$_4$, while the level of comparison sampling signal S$_5$ transmitted from control means 2 is high level "H", a closed-loop automatic power control (APC) procedure is carried out. In this closed-loop procedure, driving electric current I$_{LD}$ of semiconductor laser LD is adjusted to an initial driving electric current value corresponding to an initial value V$_{ref}$ by making a series of comparisons between detected light emission intensity voltage V$_x$ resulting from the light output of laser LD, and preset initial value V$_{ref}$. Moreover, this APC procedure is carried out during non-scanning periods of the laser. For reference purposes, the APC procedure can be thought of as being carried out by first control means 101 during non-scanning periods of the laser.

Returning now to FIG. 3, when comparison sampling signal S$_5$ falls from high level "H" to low level "L" at time t$_5$ shown in FIG. 6(e), CPU 30 stores the contents of register C in accumulator ACC which thus contains a value corresponding to initial value V$_{ref}$. Thereafter, modulation intensity value data S$_4$ ([011000]), which determines the image density of the first page of hard copy and which is stored in register B, is added to the contents of accumulator ACC. For reference purposes, inputting the modulation intensity value data can be considered to be the function of setting means 102; and the addition step can be considered as being carried out by arithmetic means 103.

After the addition step has been completed, the accumulator contains a number that represents the superposition of the default value of light intensity of the laser diode selected by the manufacturer, and a user selected increment of light that determines image density.

After this process, CPU 30 outputs the contents of accumulator ACC, i.e., driving electric current control value S$_y$, to converter 5 producing voltage V$_y$ which establishes driving electric current I$_{LD}$ of the semiconductor laser LD. Thus, the light emitted by semiconductor laser LD has an emission intensity L$_1$ obtained by adding an increment ΔL$_1$ corresponding to the modulation intensity value S$_4$, which has the value [011000] for the first page, to light emission intensity L$_0$ which corresponds to the initial driving electric current value shown in FIG. 6(g).

As is illustrated in FIG. 6(e), comparison sampling signal S$_5$ falls from high level "H" to low level "L" at time t$_5$. After a fixed delay, as shown in FIG. 6(f), control means 2 enables a printing control mechanism (not shown) so as to commence a scanning mode operation of LBP during which the laser scans a photosensitive surface (not shown) as modulation signal MD exerts control of the conduction level of transistor Tr$_2$. Thus, the image density of the hard copy that results from the above-described process is determined by the initial value V$_{ref}$ and modulation intensity value S$_4$ which, for the first page, is [011000]; and the intelligence in this page is determined by the nature of modulation signal MD.

Stated otherwise, during the scanning mode operation associated with the first page, an open-loop procedure is carried out in which the intensity of light emitted by semiconductor laser LD is controlled on the basis of driving electric current control voltage V$_y$, which is based on a value obtained by adding modulation intensity value S$_4$ ([011000] for the first page), to a value based on initial value V$_{ref}$, the modulation intensity value having been read from control means 2 during a non-scanning mode of the LBP prior to the start of the scanning mode for the first page. For reference purposes, the open-loop control procedure can be thought of as being carried out by second control means 104 operational during a scanning mode operation of the LBP.

In order to compensate for changes in light output of laser diode LD caused by thermal variations in the semiconductor material, a circuit (not shown) may be provided to keep the temperature constant. For example, a radiating plate having adequate radiation effects on semiconductor laser LD may be provided so that the temperature of the laser is kept substantially constant during the scanning mode operation of the LBP. This circuit need be effective only during the scanning printing process.

Referring again to FIG. 3, CPU 30 outputs the arithmetic value for determining image density for the first page and then checks whether or not the level of enable signal S$_1$ transmitted from control means 2 is still at high level "H". If it is, CPU 30 checks whether or not the level of reading start signal S$_2$ has risen to high level "H". If it is not, CPU stands by until the signal S$_2$ rises to high level "H", and then prepares for the next input routine.

On the other hand, if the level of enable signal S$_1$ drops to low level "L", control means 2 outputs modulation signal MD that turns ON transistor Tr$_2$ thereby terminating further light emission of semiconductor laser LD, and the program returns to the main routine by which the process described above repeats.

When modulation intensity value reading start signal S$_2$ rises to high level "H" at time t$_6$ shown in FIG. 6(b), eight steps are sequentially executed, these eight steps being the same as the steps ranging from the original input subroutine shown in FIG. 3 to the step ACC→D/A. Modulation intensity value data S$_4$ ([100000]) for the second page is read from control means 2 during the interval $t_7$-$t_6$ while the level of modulation intensity value starting signal $S_2$ is high level "H", namely, while the scanning mode operation of the LBP, which prints the first page, is being carried out. When comparison sampling signal $S_5$ rises from low level "L" to high level "H" at time $t_8$ shown in FIG. 6(e), the volume of light emission of semiconductor laser LD decreases from L1 to L0 as shown in FIG. 6(g). When comparison sampling signal $S_5$ falls to low level "L" at time $t_9$ shown in FIG. 6(e), light emission of the semiconductor laser is so controlled as to establish the relationship $L_2 = L_0 + \Delta L_2$ where $\Delta L_2$ is the increment corresponding to the image density data [100000] for the second page.

The printing operation for the first page is terminated sometime between time $t_7$ and time $t_8$ as shown in FIG. 6(f). After the eighth step, wherein ACC→D/A is processed, the program is again returned to entry point "2" where the level of enable signal $S_1$ is checked. Subsequently, the steps prior to the one described above are repeated until enable signal S1 decreases to low value "L".

FIG. 6(d) shows a situation in which modulation intensity value data $S_4$ ([001111]) for the third page is read from control means 2 in the time interval $t_{11}$-$t_{10}$ during which the printing operation for the second page is being carried out.

Unlike conventional controls for LBP's, the above described embodiment permits the image density of the hard copy of the page to set without changing the preset reference value ($V_{ref}$). In addition, the above described embodiment does not increase the time of a print cycle in which a hard copy is created. The print cycle time remains fixed because the image density for every page can be preset en masse even when the image density varies from page to page, or the image density for a succeeding page can be set during the printing operation of the preceding page. This is quite favorable in terms of design and operation relative to the APC circuit.

If the printing speed is varied page-by-page, the image density of the hard copy remains constant and independent of changes in printing speed because modulation intensity value data $S_4$ can be varied to take into account the variable rate of the printing speed.

In the above described embodiment, the modulation intensity value is manually set by means of keyboard 8. This may not be the case, however; and another electronic device can be connected to the host computer 7 for outputting modulation intensity value data.

Specific examples of numerical values in respect to the range of the light volume control of semiconductor laser LD and to image density are presented below. For example, if the range for light volume control is 0 mW to 4 mW, an eight bit D/A converter provides 256 levels within this range yielding a resolving power of 15.625 μW per bit. On the other hand, if intensity modulation range is 1 mW, the modulation intensity value data may be six bits (15.625 μW × 64 = 1 mW) as in the case of the aforementioned embodiment.

Specifically, if driving electric current control value $S_y$ becomes [10000000] when the APC control is effective on the basis of initial value $V_{ref}$, and if laser LD is arranged to be driven at 2 mW (for example, when the first page is controlled at 2 mW, the second page is controlled at 2.3 mW, and the third page controlled at 2.7 mW), the following modulation intensity values ($S_4$) may be read from control means 2: [000000] at the initial time, [010011] during printing of the first page, and [101101] during the printing of the second page.

A second embodiment of the present invention is described with reference to FIGS. 7-12 to which reference is now made. As in the case of the first embodiment, control unit 1' of the second embodiment includes control means 2, intensity adjustment control means 3', comparator 4, D/A converter 5, PIN-photodiode PD, variable resistance VR, output power source VE', resistance R, PNP-type transistor $Tr_2$, comparator 8, and D/A converter 7. Control means 2 has the same function as that of the corresponding control means employed in the first embodiment. Components in this embodiment, which are identical to components in the previously described embodiment, are identified by the same reference numerals; and components that are similar to, but somewhat different from components in the previously described embodiment, are designated by primed reference numerals.

Signal/data are transferred between intensity modulation control means 3' and control means 2 as follows: intensity modulation data $D_0$-$D_5$ (6-bit parallel data), fetch permission signal S1', sampling signal S2' and enable signal S3'. Initial voltage $V_{ref}$ is predetermined by power source VE', this initial value being inputted to non-inversion input terminal (+) of comparator 4 which compares initial voltage $V_{ref}$ with detected light emission intensity voltage $V_x$ that results due to the flow of electric current $I_m$ through variable resistance VR. Current $I_m$ corresponds to the intensity of light emitted by laser LD and is detected by PIN-photodiode PD built into the laser. At this time, the arrangement is such that, when $V_{ref} > V_x$, comparison signal $S_O$ of level "H" is outputted from comparator 4; and when $V_{ref} < V_x$, comparison signal $S_O$ of level "L" is outputted.

Comparison signal $S_O$ is inputted to input-output (I/O) device 33 of intensity modulation control means 3'. D/A converter 5 effects digital/analogue conversion of driving electric current control value $S_y$ which is outputted from I/O device 33 of control means 3'.

Resistance R, the emitter and collector of transistor $TR_1$, and semiconductor laser LD are serially connected between +Vcc and ground. Driving electric current control voltage $V_y$ is applied, via buffer 6, to the base of transistor $TR_1$. Transistor $Tr_2$ is connected in parallel across semiconductor laser LD. Modulation signal MD outputted from control means 2 is applied to the base of transistor $Tr_2$.

As a consequence of this arrangement, driving electric current $I_{LD}$ flows in the collector of transistor $Tr_1$ in response to driving electric current control voltage $V_y$. When transistor $Tr_2$ is OFF, current $I_{LD}$ flows through laser LD causing the laser to emit light in proportion to the level of current $I_{LD}$. When transistor $Tr_2$ is switched ON, laser LD is short-circuited and light output from the laser terminates.

D/A converter 7 converts the sum of intensity modulation data D0-D5 and initial voltage $V_{ref}$ into comparison reference voltage $V_r$. Comparator 8 compares comparison reference voltage $V_r$ with detected light emission voltage $V_x$ which is applied to non-inversion terminal (+) of the comparator. When $V_r > V_x$, the level of comparison signal S4' of comparator 8 is high level "H"; and, when $V_r < V_x$, the level of comparison signal S4' is low level "L".

Host computer 9 transfers multiple data such as print image data, and intensity modulation data D0-D5, or the like, to control means 2 of control unit 1' of the LBP. Keyboard 10 is provided for manually inputting the above-described intensity modulation data D0-D5; and this keyboard is used in order to manually set image density information for any or all pages of the hard copies, as required.

The operation of this embodiment is described with reference to FIGS. 8-12 after a brief explanation of an adjusting operation carried out by the manufacturer before the user has access to the apparatus. The adjustment is required to ensure that semiconductor laser LD emits an adequate amount of light in accordance with designations of the intensity modulation data D0-D5.

In carrying out the adjusting process, laser LD is driven by a light emission control signal (fully described below) during a non-scanning operation of the laser. The light emission of laser LD is brought to a predetermined level corresponding to initial voltage $V_{ref}$ by varying the resistance of variable resistance VR while measuring the intensity of light emitted by the laser using a suitable measuring instrument.

If initial voltage $V_{ref}$ is to be 2 V, and if the corresponding volume of light is to be 2 mW, the level of electric current $I_m$ flowing through diode PD to provide this volume of light may vary from 0.2 mA to 1.0667 mA, depending on the differential efficiency of the particular laser being used. However, if the resistance of variable resistance VR is varied within the range 10 kohm to 1.875 kohm, the intensity of light emission of laser LD can be brought to the value 2 mW. Assume that a laser with a certain differential deficiency requires the variable resistance VR to have a value of 10k ohm in order for the laser to output light of volume 2 mW while electric current $I_m=0.2$ mA under the condition that $V_x=V_{ref}=2$ V. Then another laser with a differential efficiency half that of the first mentioned laser would emit light of volume 1 mW when electric current $I_m=0.2$ mA. By doubling current $I_m$ to 0.4 mA, and changing variable resistance VR to 5 kohm, the $I_{LD}$ would increase to a level that would result in increasing the light volume of the laser from 1 mW to 2 mW.

Even though electric current $I_m$ varies from application to application because of the differential efficiency $\eta$ of various lasers, the variations are accounted for by suitably adjusting the value of variable resistance VR at the factory. Consequently, the user controls light emission of the laser during the printing operation solely on the basis of intensity modulation data D0-D5 independently of the differential efficiency of the laser.

When the LBP is operational upon the completion of the above-described adjustments, the user may input a modulation intensity value at keyboard 10 in order to establish the printing concentration (image density) of a hard copy to be produced by the LBP. Modulation intensity value data set from keyboard 10 is transferred to, and stored in, predetermined data storage areas in host computer 9 and in control means to of control unit 1'. Standard, or default, modulation intensity values are written beforehand in the data storage areas of the host computer, and of control means 2. On an occasion when the user of the LBP does not utilize keyboard 10 to input the values, standard values are employed.

Figure 8:
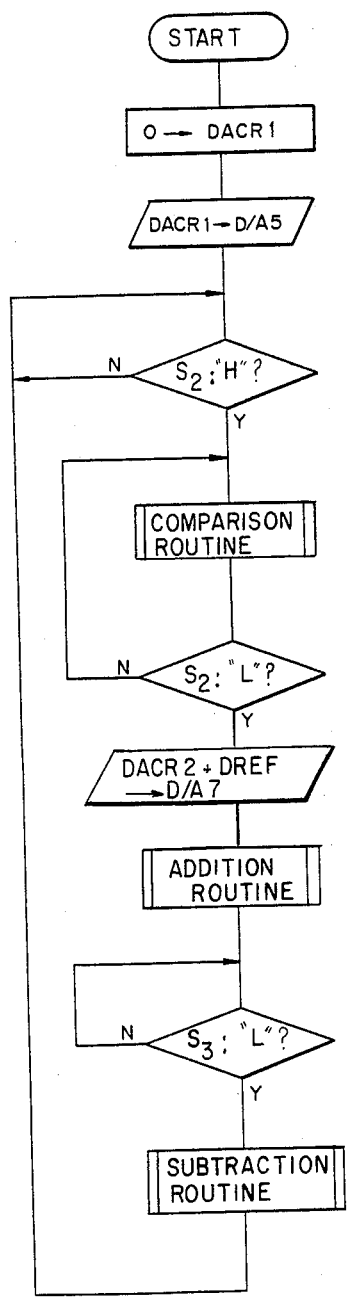
FIG. 8 is a flow chart of programs to be executed by CPU 30 of FIG. 7.
Figure 9:
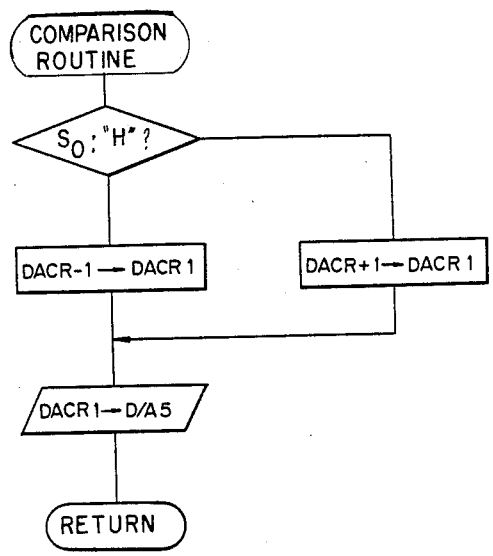
FIG. 9 is a flow chart of a comparison routine of FIG. 8.
Figure 10:
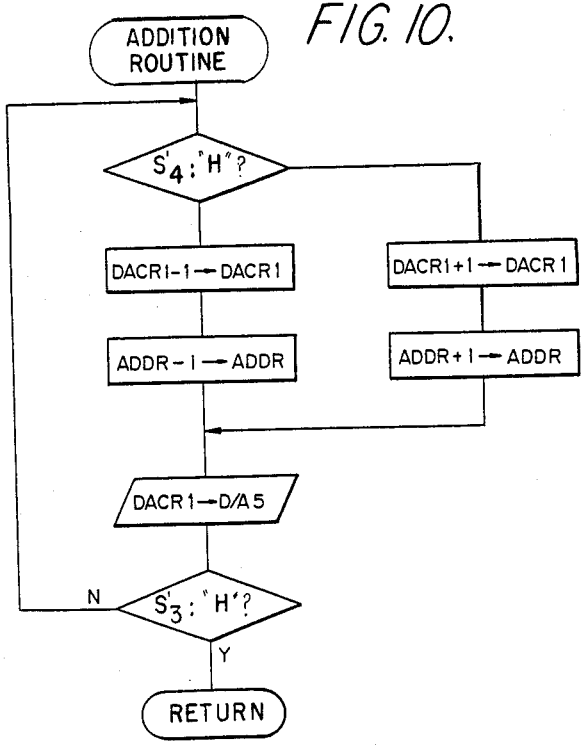
FIG. 10 is a flow chart of programs of an addition routine of FIG. 8.

As shown in FIG. 8, upon actuation of the LBP, CPU 30 of intensity modulation control means 3' performs a required initialization process. First, CPU 30 writes [0] to register DACR1 for output to D/A converter 5 which responds by outputting [0] to establish driving electric current control value $S_Y$ which is applied to converter 5 whose output voltage $V_Y$ is applied to buffer 6. Under this condition, transistor $Tr_1$ causes a preset, feeble, driving electric current $I_{LD}$ to flow in the collector of transistor $Tr_1$. Concurrently, modulation signal MD produced by control means 2 is applied to the base of transistor $Tr_2$ turning this transistor ON thereby short circuiting laser LD and preventing it from emitting light. CPU 30 then checks the level of sampling signal $S_2$. If the level of signal $S'_2$ is low level "L", CPU 30 waits until signal $S'_2$ reaches high level "H". When this occurs at time $t_1$ shown in FIG. 12(c), CPU 30 moves to the next step in which a comparison routine (FIG. 9) is executed.

At a predetermined time before sampling signal $S'_2$ rises to high level "H" at time $t_1$, control means 2 outputs intensity modulation data D0-D5 (6-bit parallel data), as shown in FIG. 12(a) to I/O device 33. This intensity modulation data determines the image density of the first page of the document to be printed. Following this, CPU 30 outputs fetch permission signal $S'_1$ (latch signal) as shown in FIG. 12(b) to I/O device 33 and then stores, or latches, intensity modulation data D0-D5 in the form $D_5 D_4 D_3 D_2 D_1 D_0 = [010000]$ where $D_5$ is the most significant digit, and $D_0$ is the least significant digit. The data are stored in register DACR2 for output to converter 7.

At time $t_1$, when sampling signal $S'_2$ rises to high level "H", control means 2 causes the level of modulation signal MD applied to base of transistor $TR_2$ to reach low level "L" thereby changing the state of transistor $TR_2$ from ON to OFF. Consequently, weak collector electric current $I_{LD}$ flows through laser LD which responds by emitting a low level of light. The comparison routine shown in FIG. 9 checks whether or not the level of comparison signal $S_O$ of comparator 4 is high level "H".

As described above, laser LD will be emitting light under the weak electric driving current $I_{LD}$ when the comparison routine is called; and electric current $I_m$, which is proportional to the intensity of light emitted by laser LD, flows through photodiode PD. For this reason, detected light emission intensity voltage $V_x$ appears at inversion input terminal (−) of comparator 4. This voltage is obtained by effecting a voltage-current conversion on electric current $I_m$ flowing through VR, such current corresponding to the light emission intensity of laser LD driven by weak driving electric current $I_{LD}$. Voltage $V_x$ is compared with initial voltage $V_{ref}$ inputted to the non-inversion input terminal (+). The circuit is designed so that the inequality $V_{ref} > V_x$ is established in this initial state. Consequently, the level of comparison signal $S_O$ is high level "H".

As a result of a further level check of signal $S_O$, CPU 30 increments register DACR1 whose contents are [0] at this initial time. Driving electric current control value $S_Y$ at the input of converter 5 is thus increased by the new output of CPU 30 which then returns to the main routine. The main routine repeatedly call-executes the above-mentioned comparison routine until the level of sampling signal $S_2$ sent from control means 2 falls to low level "L" at time $t_2$ shown in FIG. 12(c). In this manner, register DACR1 is sequentially incremented, and concomitantly, the level of driving electric current control voltage $V_Y$ is increased in steps. This stepwise increase is accompanied by a stepwise increase in light by the laser. Eventually, $V_{rev} > V_x$, and comparison signal $S_O$ drops to low level "L".

CPU 30 responds to this condition by decrementing register DACR1 in the comparison routine, which results in a decrease in driving electric current control value $S_Y$. If time interval $t_2-t_1$ is sufficiently long, detected light emission intensity voltage $V_x$ converges to the value of $V_{ref}$ such that $V_x$ is approximately equal to $V_{ref}$. At this time, the contents of register DACR1 contains a number corresponding to initial voltage $V_{ref}$, and driving electric current $I_{LD}$ reaches an initial drive electric current value corresponding to the initial voltage $V_{ref}$.

During the interval $t_2-t_1$, when the level of sampling signal $S_2$ remains at high level "H", that is, during a non-scanning mode of operation of the LBP, detected light emission intensity voltage $V_x$ produced by light emitted from laser LD is compared with preset initial voltage $V_{ref}$. This procedure is a closed-loop automatic power control (APC) procedure wherein driving electric current $I_{LD}$ of laser LD is adjusted to an initial value corresponding to initial voltage $V_{ref}$.

Referring back to FIG. 8, when the level of sampling signal $S'_2$ drops from high level "H" to low level "L" at time $t_2$ shown in FIG. 12(c), CPU 30 adds intensity modulation data D0-D5 for the first page, which is stored in register DACR2, to initial data $D_{ref}$ contained in register DACR1 corresponding to the initial voltage $V_{ref}$. Subsequently, CPU 30 outputs the sum to D/A converter 7, and moves to the next step in which an additional routine (FIG. 10) is executed.

When this addition routine is called, $V_x = V_{ref}$, and the output of converter 7 is representative of the sum of intensity modulation data D0-D5 and initial data $V_{ref}$, and CPU 30 checks whether or not comparison signal $S'_4$ of comparator 8 has reached high level "H". Comparison signal $S'_4$ will have high level "H" because $V_x < V_r$. Consequently, CPU 30 increments register DACR1 (whose contents prior to being incremented corresponded to initial voltage $V_{ref}$), and successively increments adding condition register ADDR (whose contents previous to this was [0]). Thereafter, CPU 30 outputs the thus incremented values to form driving electric current control value $S_Y$ supplied to D/A converter 5. CPU 30 then checks whether or not enable signal $S'_3$ has risen to high level "H". If so, CPU 30 returns to the main menu. If enable signal $S'_3$ remains at low level "L" while comparison signal $S'_4$ remains at high level "H", the steps described above are repeated: register DACR1 is incremented. Consequently, driving electric current voltage $V_Y$ increases in proportion to the above-described increment whereby the intensity of light emitted by laser LD also incrementally increases.

As the intensity of light emitted by semiconductor laser LD increases, the detected light emission intensity $V_x$ increases. Eventually, a point is reached where $V_x > V_r$. At this point, comparison signal $S'_4$ decreases to low level "L"; and, CPU 30 decrements register DACR1 in the addition routine, and at the same time decrements the value of addition addition register ADDR. CPU 30 then outputs the value of register DACR1 in the form of driving electric current control value $S_Y$ to converter 5 which reduces the intensity of light emitted from the laser. The detected light emission intensity value $V_x$ thus converges toward a point where $V_x = V_r$ by the time enable signal $S'_3$ rises to high level "H" at time $t_3$. The time required to reach this situation defines the interval $\tau_x$ shown in FIG. 12(c). In this manner, the contents of DACR1 are representative of the sum of initial voltage $V_{ref}$ and intensity modulation data D0-D5 for the first page of the document to be printed. Consequently, laser LD begins to emit light with an intensity at a control value representative of the sum of the initial reference intensity and intensity modulation data D0-D5. As shown in FIG. 8, upon a return from the addition routine to the main routine, CPU 30 waits until enable signal $S'_3$ falls from high level "H" to low level "L", and maintains the light emission intensity of laser LD at the control value established during the addition routine.

At time $t_3$, enable signal $S'_3$ rises to high level "H" as shown in FIG. 12(d). After a predetermined period of time, control means 2 issues a printing command to the LBP, and a control mechanism (not illustrated) starts the print scanning operation. Control means 2 also exerts ON-OFF control over transistor $Tr_2$ by way of modulation signal MD. The resultant image density of the first hard copy page is thus determined both by the initial voltage $V_{ref}$ and by intensity modulation data D0-D5 for the first page.

That is, during the time of laser beam scanning printing of the first page, an open loop control of the light emission intensity of the semiconductor laser LD is effected on the basis of driving electric current control voltage $V_Y$ obtained by adding initial voltage $V_{ref}$ to image density data D0-D5 for the first page of hard copy, such data being read from the control means 2 prior to the start of the printing of the first page.

In automatic power control systems used with a conventional LBP, a circuit is usually provided for compensating for changes in light output caused by temperature changes in the laser. Such a circuit, however, is not appropriate in an open loop control such as utilized in the present invention. Therefore, in order to maintain the semiconductor at constant temperature, the present invention may include a radiator plate (not shown) having sufficient radiating effect to prevent significant variations in temperature of the laser during a printing operation (typically about 10 sec.).

Figure 11:
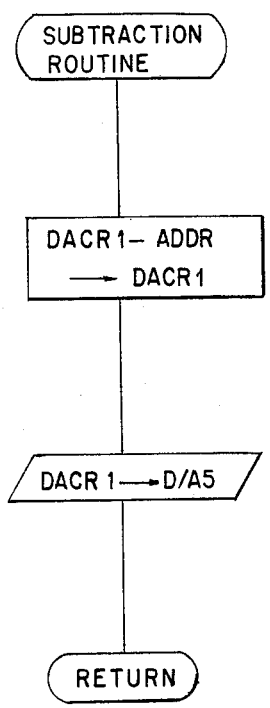
FIG. 11 is a flow chart of a subtraction routine of FIG. 8.
Figure 12:
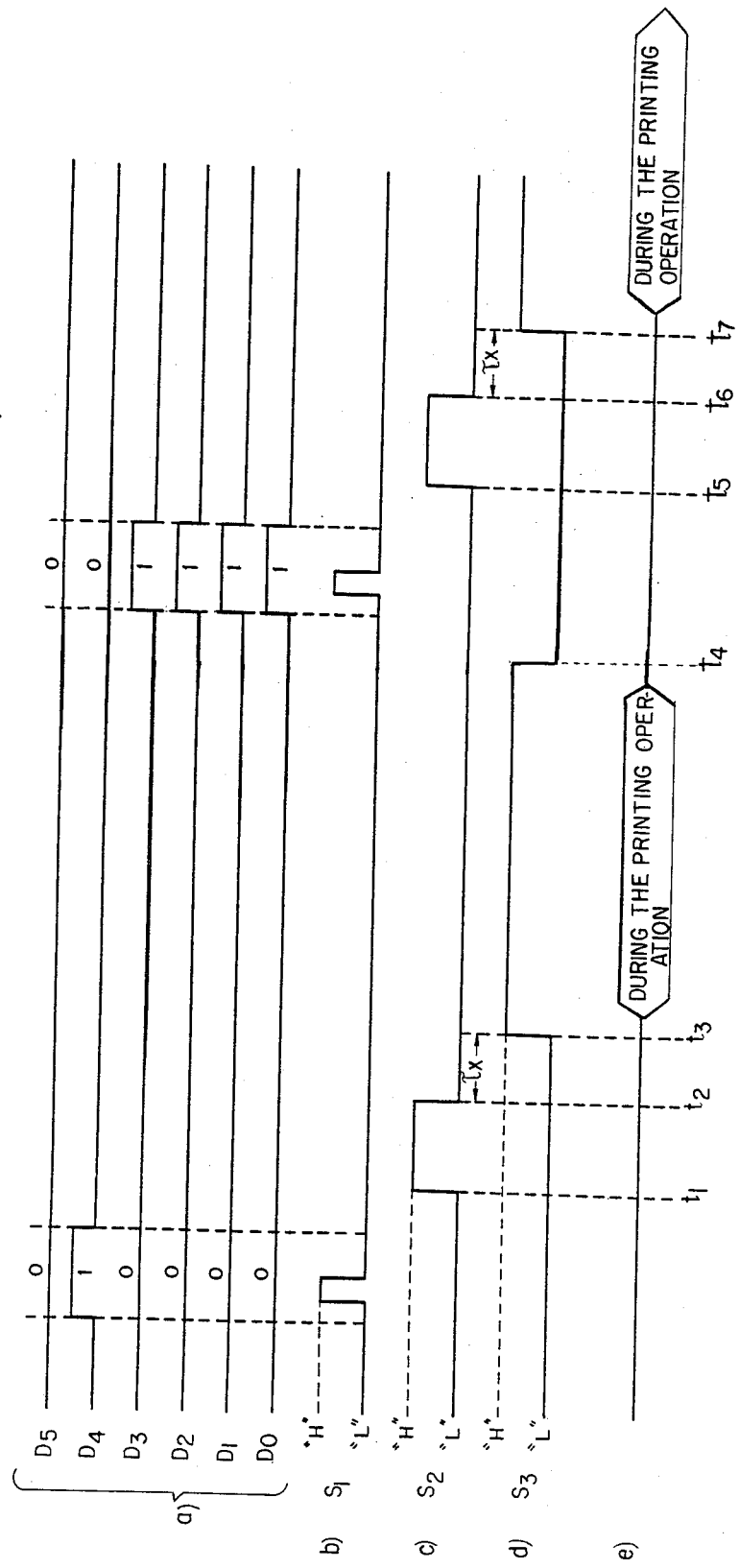
FIG. 12 is a timing chart relative to the operation of the embodiment of FIG. 7.

After a printing operation is completed, enable signal $S'_3$ falls from high level "H" to the low level "L". As shown in FIG. 8, CPU 30 moves to the next step wherein the subtraction routine shown in FIG. 11 is executed. When this subtraction routine is called, the contents of adding condition register ADDR are subtracted from the contents of register DACR1 thus returning the contents of DACR1 to the number corresponding to initial voltage $V_{ref}$, and CPU 30 is returned to the main routine. The contents of DACR1 constitutes driving electric current control voltage $S_y$ which is outputted to D/A converter 5.

After executing the subtraction routine and returning to the main routine, control means 2 outputs a modulation signal MD that turns ON transistor $Tr_2$ causing temporary termination of light output from the laser. CPU 30 returns to checking the level of sampling signal $S'_2$. The process described above is repeatedly executed.

During the interval between times $t_4$ and $t_5$, fetch permission signal $S'_1$ is outputted from control means 2 to intensity modulation control means 3', and as a consequence, intensity modulation data D0-D5 [001111]) for the second page is transferred to register DACR2. At time $t_5$, sampling signal $S'_2$ rises and remains at level "H" until time $t_6$ when it falls to low level "L". Thereafter, enable signal $S'_3$ rises at time $t_7$ shown in FIG. 12(d) after a time period $\tau_x$ after signal $S'_2$ has fallen to level "L". By reason of this process, the image density of the hard copy for the second page is determined both by the initial intensity and by intensity modulation data D0-D5 for the second page.

If the printing speed is to be varied for every page, the image density for each page can be kept constant and independent of printing speed by varying the intensity modulation data D0-D5 in accordance with variations in printing speed.

In the above-described embodiment, intensity modulation data are user-set by keyboard 10. This need not be the case because another electronic device can be connected to host computer 9, and intensity modulation data may be set and outputted from this electronic device.

In the first described embodiment of the invention, fixed resistance $R_1$ may be replaced by a variable resistance such as employed in the second embodiment in order to achieve the advantages gained by the variable resistance in the second embodiment.

As indicated above, the present invention has a number of advantages. First, the image density of the hard copy of any page of a document produced by a LBP according to the present invention can be changed without affecting the reference value in an APC circuit whereby the print cycle time of the LBP remains constant. This is quite favorable in terms of a design and operations relative to the APC circuit. Moreover, by employing a variable resistance for converting a monitored electric current, which flows through a photoconductor whose impedance is responsive to the intensity of light emitted by a laser of an LBP, to a voltage that may be compared with a reference to establish the light emission of the laser, the light output of a laser can be made independent of its differential efficiency.

Those skilled in the art will appreciate that the foregoing description of preferred embodiments of the present invention are illustrative only, and that various changes and modifications in the invention as defined by the appended claims may be made without departing from the spirit and scope of the invention.

We claim:

1. In a laser beam printer (LBP) in which a hard copy of image information such as numbers, letters or the like is obtained by scanning a laser beam produced by operating the LBP in a scanning mode wherein a semiconductor laser is modulated during scanning on the basis of said image information, an intensity control device for said semiconductor laser comprising;
    (a) first control means effective only during a non-scanning mode of operation of the LBP for bringing driving electric current supplied to said laser to a preset initial value representative of a preset intensity of light emitted by said laser including a closed-loop that compares said preset initial value with a value representative of the actual intensity of light emitted by said laser;
    (b) setting means for setting a modulation intensity value representative of the desired image density of a hard copy;
    (c) arithmetic means effective only during a non-scanning mode of operation of the LBP for computing a driving electric current control value by adding said modulation intensity value to said initial value; and
    (d) second control means effective during a scanning mode of operation of the LBP for controlling the light emission intensity of said semiconductor laser on the basis of said driving electric current control value.

2. An intensity control device according to claim 1 wherein said closed-loop includes a light receiving element whose impedance is a function of the intensity of light emitted by said semiconductor laser.

3. An intensity control device according to claim 1 wherein, between said first control means and said second control means, are means for effecting serial-transfer of an enable signal, a modulation intensity value reading start signal, a synchronizing signal, signal representative of a modulation intensity value data, and a comparison sampling signal.

4. An intensity control device according to claim 1 wherein, between said first control means and said second control means, are means for effecting a parallel transfer of intensity modulation data a fetched permission signal, a sampling signal, and an enable signal.

5. An intensity control device for a laser of a laser beam printer that produces a hard copy of image information by copy-processing a photosensitive surface scanned by the laser while it is in a scanning mode during which the laser is modulated by said image information, said intensity control device comprising:
    (a) means operative during a non-scanning mode of said laser for storing a first representation of a preset light intensity of said laser;
    (b) means for storing a second representation of a user selected image density for a hard copy produced by the printer;
    (c) means operative during a non-scanning mode of said laser for combining said first and second representations and thus forming a control voltage; and
    (d) control means responsive to said control voltage for producing a current that is supplied to said laser which thereby emits light whose intensity is dependent on both said first and second representations.

6. An intensity control device according to claim 5 wherein said means for storing a first representation includes:
    (a) photosensitive means responsive to the intensity of light emitted by said laser for producing a voltage $V_x$ representative of said last mentioned intensity;
    (b) means for producing a voltage $V_{ref}$ representative of a preset light intensity;
    (c) a comparator for comparing the voltage $V_x$ with the voltage $V_{ref}$ and producing an output voltage having a first level when $V_{ref} > V_x$, and having a second level when $V_{ref} < V_x$;
    (d) a first digital register; and
    (e) means for sequentially evaluating the level of said output voltage over a predetermined period of time and incrementing said first register when the output voltage has said first level, and decrementing said first register when said output voltage has said second level whereby, at the end of said predetermined period of time, the contents of said first register is representative of a preset intensity of said laser at which $V_{ref}$ is approximately equal to $V_x$.

7. An intensity control device according to claim 6 wherein:
    (a) said means for storing a second representation includes a second digital register, and means for setting the contents of said second register with a user selected image density; and
    (b) said means for combining said first and second representations includes means for adding the contents of said first and second registers to define a sum, and storing said sum in a sum register, and a D/A converter responsive to the contents of said sum register for producing said control voltage.

8. An intensity control device according to claim 7 wherein said means for setting the contents of said second register is operative only during the time said laser is in a non-scanning mode.

9. An intensity control device according to claim 5 wherein said control means includes a solid state device having an output electrode for connection to said laser, and a control electrode to which said control voltage is applied for controlling the level of current in said output electrode in accordance with the level of current flowing in said control electrode, and a selectively operable switch shunting said laser.

10. An intensity control device according to claim 9 including means for holding said selectively operable switch in an open position during a non-scanning mode of said laser.

11. An intensity control device according to claim 10 wherein said selectively operable switch is constructed and arranged to operate in response to image information during a scanning mode of said laser.

12. An intensity control device according to claim 11 wherein said means for storing a second representation of a user selected image density is operational during a scanning mode of said laser.

13. A method for controlling the intensity of a laser in a laser beam printer that produces a hard copy of image information by copy-processing a photosensitive surface scanned by the laser while it is in a scanning mode during which the laser is modulated by image information, said method comprising the steps of:
    (a) storing a first representation of a preset light intensity of said laser during a non-scanning mode of said laser;
    (b) storing a second representation of a user selected image density for a hard copy produced by the printer;
    (c) combining the first and second representations during a non-scanning mode of said laser for forming a control voltage; and
    (d) producing a current that is supplied to said laser in response to said control voltage whereby the intensity of light emitted by said laser is dependent on both of said representations.

14. The method of claim 13 including the step of operating the laser in a scanning mode while said current is supplied.

15. The method of claim 14 wherein the step of combining includes adding the first and second representations.

16. The method of claim 15 including the step of subtracting the second representation from the first after the step of operating the laser in a scanning mode is completed.

17. A method for controlling the intensity of a laser in a laser beam printer that produces a hard copy of image information by copy-processing a photosensitive surface scanned by the laser while it is in a scanning mode during which the laser is modulated by image information, said method comprising the steps of:
    (a) generating a voltage $V_x$ representative of the intensity of light emitted by the laser;
    (b) generating a voltage $V_{ref}$ representative of a preset value of light intensity of said laser;
    (c) comparing $V_x$ with $V_{ref}$ and producing an output signal of one level when $V_{ref} > V_x$, and an output signal of another level when $V_x > V_{ref}$;
    (d) sequentially incrementing a register while the output signal of said comparator remains at said one level;
    (e) converting the contents of said register to a control voltage; and
    (f) using said control voltage to control the level of current flowing through, and hence the intensity of light emitted by, the laser whereby the intensity of light produced by the laser increases in stepwise fashion to said preset value.

18. The method of claim 17 including the step of generating the voltage $V_{ref}$ from an adjustable power supply.

19. The method of claim 17 including the step of generating the voltage $V_x$ using an adjustable resistor in series with a photodetector response to light emitted by the laser.

* * * * *

UNITED STATES PATENT AND TRADEMARK OFFICE
CERTIFICATE OF CORRECTION

PATENT NO.   : 4,727,382

DATED        : February 23, 1988

INVENTOR(S)  : Kiyoshi NEGISHI et al.

It is certified that error appears in the above-identified patent and that said Letters Patent is hereby corrected as shown below: Title page:

In the Abstract, lines 9 and 10, change "representations" to ---representation---.

At column 1, line 6, change "1. TECHNICAL FIELD" to ---1. Technical Field---.

At column 2, line 53, insert ---, which--- before "includes".

At column 3, line 63, insert ---,--- after "102".

At column 16, line 16 (i.e., in claim 4, line 4), insert ---,--- after "data".

Signed and Sealed this

Thirteenth Day of December, 1988

Attest:

DONALD J. QUIGG

*Attesting Officer*  *Commissioner of Patents and Trademarks*